(12) United States Patent
Kalimuthu et al.

(10) Patent No.: US 11,009,419 B2
(45) Date of Patent: May 18, 2021

(54) PRESSURE GAUGE FLANGE ASSEMBLY

(71) Applicant: Worldwide Oilfield Machine, Inc., Houston, TX (US)

(72) Inventors: Anand Kalimuthu, Houston, TX (US); Avninder Pal Singh, Houston, TX (US)

( * ) Notice: Subject to any disclaimer, the term of this patent is extended or adjusted under 35 U.S.C. 154(b) by 156 days.

(21) Appl. No.: 16/249,216

(22) Filed: Jan. 16, 2019

(65) Prior Publication Data

US 2019/0391028 A1 Dec. 26, 2019

Related U.S. Application Data

(60) Provisional application No. 62/689,986, filed on Jun. 26, 2018.

(51) Int. Cl.
*G01L 19/00* (2006.01)
*G01L 19/06* (2006.01)

(52) U.S. Cl.
CPC ........ *G01L 19/003* (2013.01); *G01L 19/0627* (2013.01)

(58) Field of Classification Search
CPC . G01L 19/003; G01L 19/0627; G05D 16/107; G05D 16/10; E21B 23/006; A61B 5/02233
USPC .......................................................... 73/706
See application file for complete search history.

(56) References Cited

U.S. PATENT DOCUMENTS

| | | | | |
|---|---|---|---|---|
| 2,216,374 A | * | 10/1940 | Martin | G01L 19/0007 73/706 |
| 2,515,867 A | * | 7/1950 | Fuller | H01H 35/34 338/42 |
| 3,732,725 A | * | 5/1973 | Allen, Jr. | G01N 3/48 73/81 |
| 3,863,504 A | | 2/1975 | Borsanyi | |
| 4,790,821 A | * | 12/1988 | Stines | A61M 25/1018 604/97.03 |
| 5,011,537 A | | 4/1991 | Voegele et al. | |
| 5,022,271 A | | 6/1991 | Hannon, Jr. | |
| 5,347,868 A | * | 9/1994 | Shigesada | G01L 19/0023 73/706 |
| 6,161,573 A | * | 12/2000 | Sheng | G05D 16/10 137/505.41 |
| 7,188,531 B1 | * | 3/2007 | Feldmeier | G01L 7/16 73/744 |
| 7,784,353 B1 | * | 8/2010 | Feldmeier | G01L 19/0672 73/744 |
| 8,499,681 B2 | * | 8/2013 | Kanner | A61M 25/10187 92/15 |

(Continued)

*Primary Examiner* — Octavia Hollington
(74) *Attorney, Agent, or Firm* — Kenneth L. Nash; Thomas D. Nash

(57) ABSTRACT

A pressure gauge flange assembly for connection to pressure equipment and a pressure gauge. The pressure gauge flange assembly has a flange housing with a flange at a lower portion that connects to pressure equipment such as a BOP. Within the flange housing a chamber is provided that is separated into two chambers by a piston. The piston is moveable to balance pressure in the two chambers. Fluid from the pressure equipment may be dirty. On the other side of the piston, clean fluid is provided so that any dirty hydraulic fluid from the pressure equipment does not impair operation of the pressure gauge.

13 Claims, 2 Drawing Sheets

(56) References Cited

U.S. PATENT DOCUMENTS

| | | |
|---|---|---|
| 9,003,890 B2 | 4/2015 | Levenson et al. |
| 2013/0160560 A1* | 6/2013 | Strei .................... G01L 19/003 73/706 |

* cited by examiner

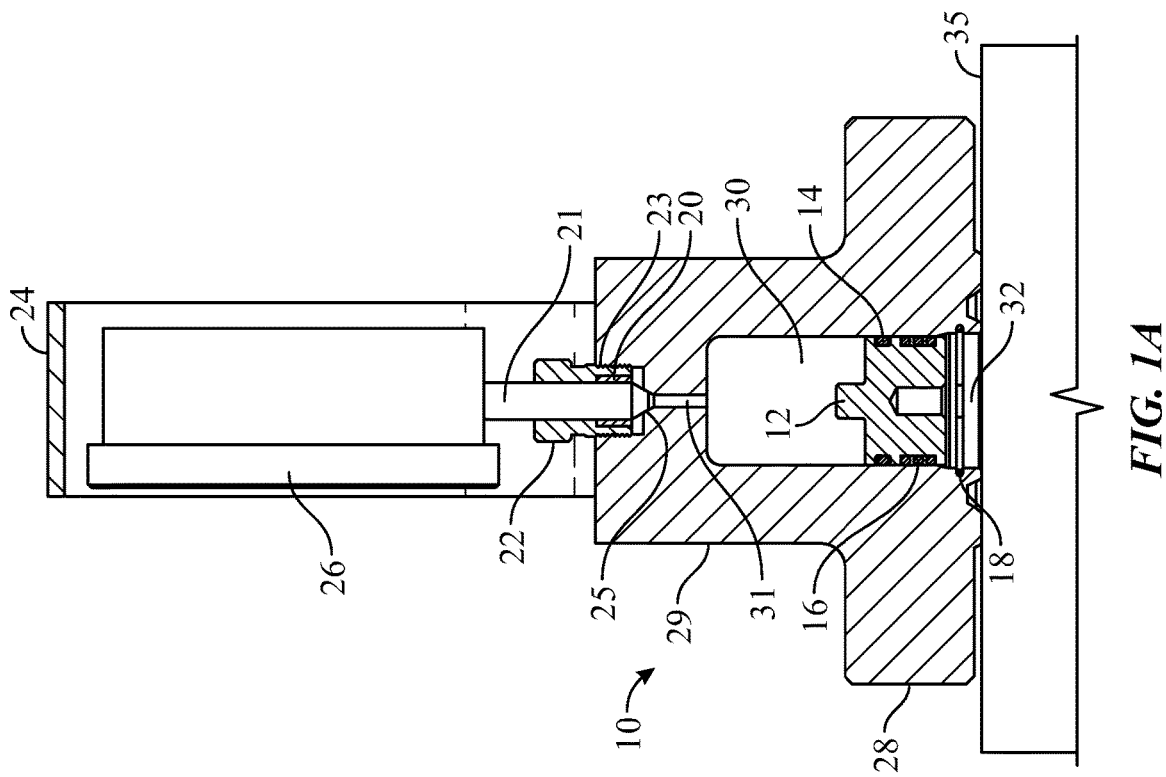
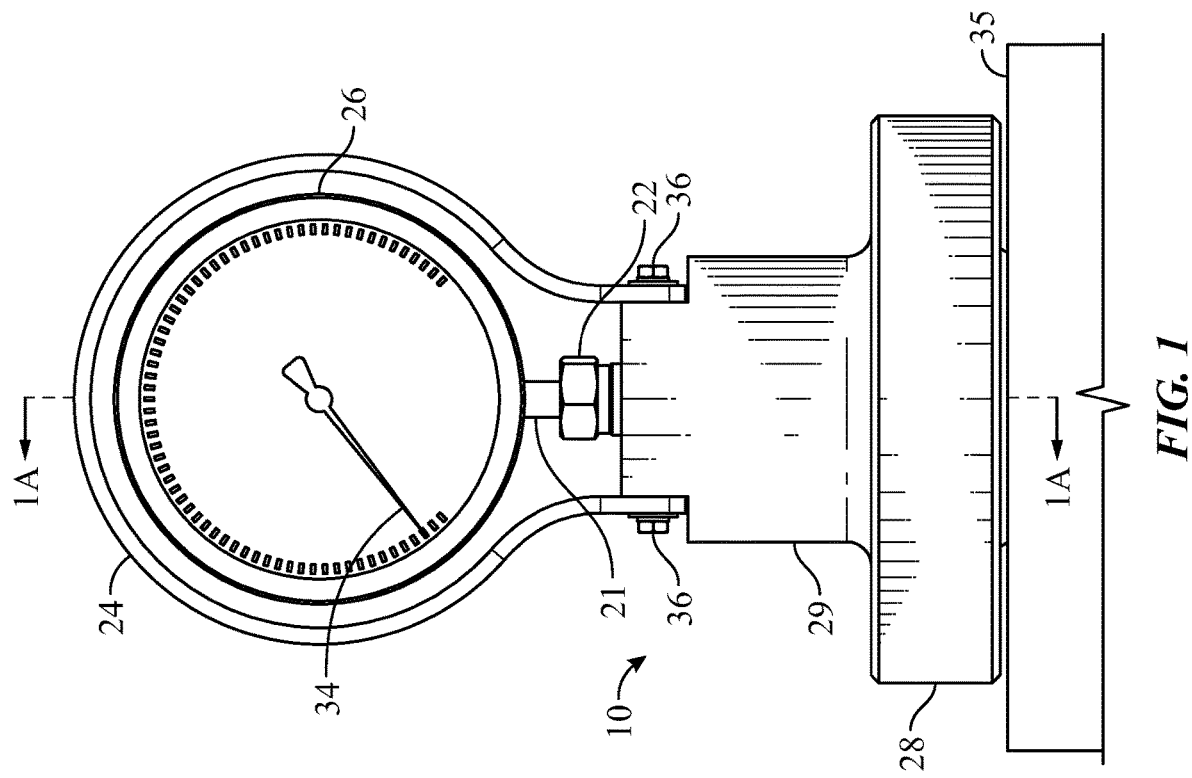

PRESSURE GAUGE FLANGE ASSEMBLY

FIELD OF THE INVENTION

The present invention relates generally to pressure gauges for pressure equipment and, more particularly, to a pressure gauge flange assembly that prevents foreign particles from entering the pressure gauge.

BACKGROUND OF THE INVENTION

A Bourdon pressure gauge is considered reliable and robust although any blockage of the piping leading to the open end of the Bourdon tube will render the gauge inoperable or unreliable. Repairing the gauge is rarely possible unless using specialist equipment. While Bourdon gauges are relatively inexpensive, it is often times difficult to replace gauges that are used in subsea environments.

Oil field pressure equipment, such as a subsea BOP, may possibly have contaminated fluid that could present problems for the pressure gauge. Filters between the pressure equipment and pressure gauge may cause problems with inaccuracies and plugging.

Accordingly, those of skill will appreciate the present invention that makes the pressure gauge used with pressure equipment more reliable.

SUMMARY OF THE INVENTION

One object of the present invention is to provide clean hydraulic fluid to a pressure gauge that represents pressure in pressure equipment to which the pressure gauge is attached.

Another object of the present invention is to provide a pressure gauge assembly comprising a piston that separates clean hydraulic fluid going to the pressure gauge with potentially contaminated fluid from the pressure equipment.

These and other objects, features, and advantages of the present invention will become clear from the figures and description given hereinafter. It is understood that the objects listed above are not all inclusive and are only intended to aid in understanding the present invention, not to limit the bounds of the present invention in any way.

One general aspect of the present invention is a pressure gauge flange assembly for connection to pressure equipment and for connection to a pressure gauge. The pressure gauge flange assembly may comprise a flange housing that defines a pressure chamber. Other features may comprise a flange housing being connectable to the pressure gauge. A flange on the flange housing may extend radially outwardly from the flange housing. The flange may be connectable to the pressure equipment. A piston may be mounted in the flange housing wherein the piston divides the pressure chamber into a first chamber and a second chamber. The first chamber being in fluid communication with the pressure gauge when the pressure gauge is connected to the flange housing. The second chamber is in fluid communication with the pressure equipment when the pressure equipment is connected to the flange housing. The piston is responsive to pressure in the second chamber to activate the pressure gauge through the first chamber. The piston may be sealed to prevent fluid from the second chamber from entering the first chamber.

Other possible aspects of the invention may comprise one or more of a retainer ring mounted in the flange that retains the piston within the flange housing. Openings around a periphery of the flange may be adapted to receive fasteners. The flange housing comprises an upper portion with a smaller diameter than the flange with a gland nut. The gland nut comprises an opening and a seal to receive and seal with a tube from the pressure gauge when the pressure gauge is present. The pressure gauge itself and/or the pressure equipment comprises a blowout preventer.

Another general aspect of the present invention may comprise a method to provide a pressure gauge flange assembly for connection to pressure equipment and a pressure gauge. Steps may include mounting a piston in the pressure gauge flange assembly. A pressure chamber may be provided with a first chamber on one side of the piston that is connectable to the pressure equipment. A second chamber may be provided on an opposite side of the piston that is connectable to the pressure gauge. The piston is sealed to prevent fluid flow from the pressure equipment to the pressure gauge. A flange may be provided for the pressure gauge flange assembly to secure the pressure gauge flange assembly to the pressure gauge. The piston is moveable in response to pressure changes in the pressure equipment to transmit pressure from the pressure equipment to the pressure gauge.

Other possible aspects of the invention may comprise one or more of providing that the flange radially extends from the flange housing, and providing that the flange housing and the flange are monolithically formed. A retainer ring may be provided to prevent the piston from coming out of the flange housing. A connector may be provided comprising an internal opening and a seal to receive a tube comprising a smooth outer surface from the pressure gauge. Threads may be provided on a nut that mates to threads in the flange housing, providing that the nut has a seal to receive the tube and seal around the tube.

BRIEF DESCRIPTION OF THE DRAWINGS

The general description listed above and following detailed description is merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

FIG. 1 is a front elevational view of a pressure gauge flange assembly in accord with one possible embodiment of the present invention.

FIG. 1A is a side view, partially in section, of a pressure gauge flange assembly in accord with one possible embodiment of the present invention.

DETAILED DESCRIPTION

Figure 2:
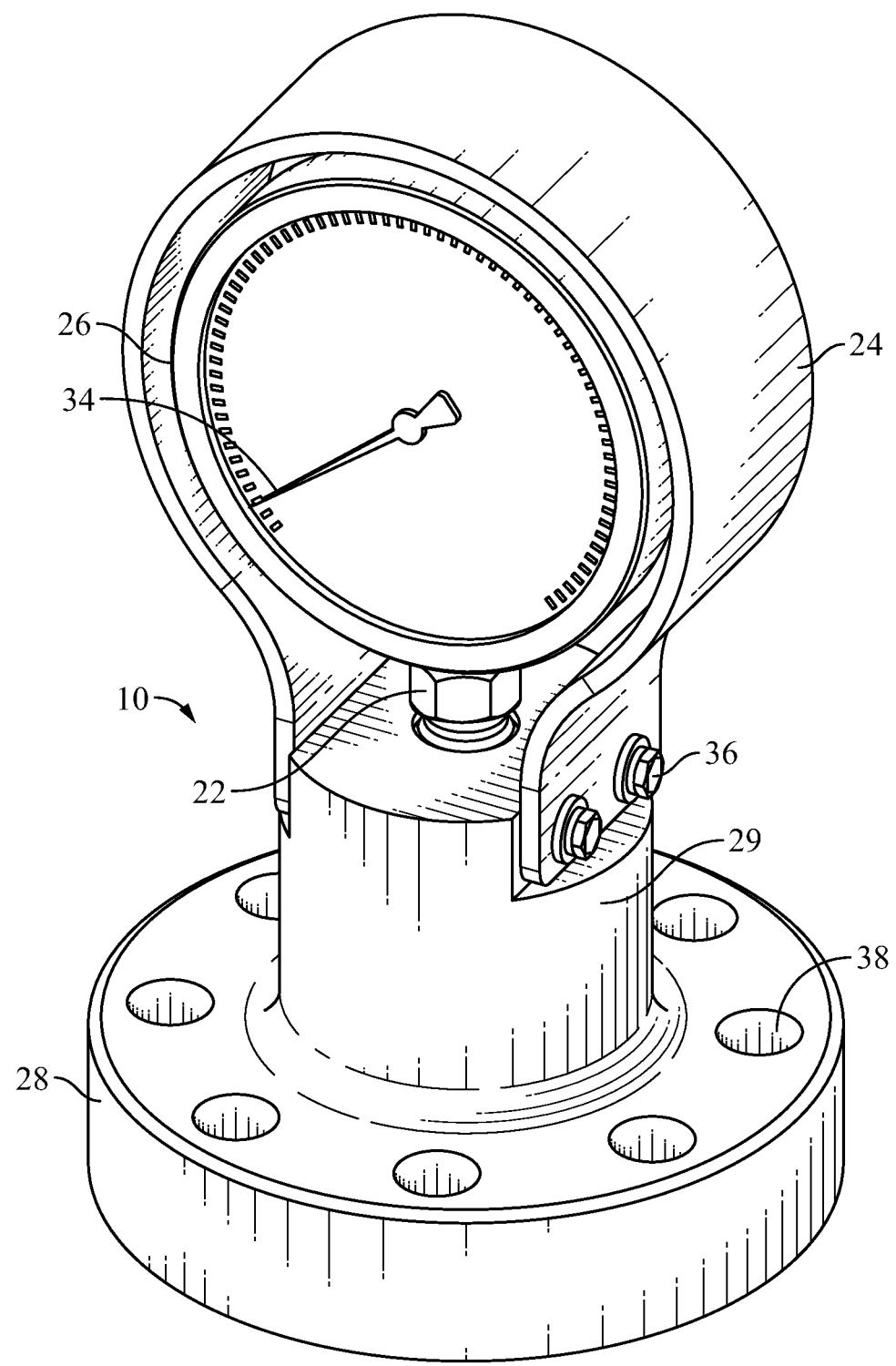
FIG. 2 is a perspective view of a pressure gauge flange assembly in accord with one possible embodiment of the present invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning to FIGS. 1 & 2, a metal pressure gauge flange assembly 10 is shown from various perspectives. The entire assembly 10 may comprise pressure gauge 26, flange housing 29 with flange 28. In other words, everything except the pressure equipment 35. The flange housing 29 and related internal components are made in accord with the present invention. The pressure gauge 26 is readily commercially available. The Pressure Gauge Flange assembly may comprise a pressure gauge 26 secured to a flange housing 29 by a gland nut 22. Gland nut 22 comprises a collar 20 which may preferably have left hand side threads that receive tube 21 with corresponding threads on tube 21. Tube 21 from pressure gauge 26 is externally smooth at the conical end opposite to the gauge. The conical end 25 seals with the corresponding groove on flange 29 with a metal to metal seal. Gland nut 22 comprises external threads 23 that mate to corresponding internal threads in the flange housing which holds the gauge in place. Threads 23 may be right hand threads. A gauge protector 24 surrounds the gauge 26. The gauge protector is secured to the flange housing by fasteners 36 to prevent damage during operation. Needle 34 provides a visual indication of the pressure.

Pressure gauge flange assembly 10 comprises a flange 28 that may extend radially outwardly from the flange housing 29. Preferably flange 28 and flange housing 29 are monolithically formed so that there are no joints between them requiring fasteners. Flange 28 and flange 29 are made preferably machining from a single piece. The upper portion of the flange housing 29 may have a smaller diameter than the flange 28. Flange 28 preferably comprises fastener openings 38 (See FIG. 2) around the periphery of the flange for fasteners to secure pressure gauge flange assembly 10 to pressure equipment 35. Pressure equipment 35 may be used with a blowout preventer, dual gate cutter, manifolds or the like.

Referring also to FIG. 1A, the pressure gauge, in one embodiment, works on the Bourdon tube principle and has a tube 21 connected to the pressure gauge through the gland nut 22 and exposed on one end to internal pressure chamber 30 through passageway 31 formed within flange housing 29. The tube 21 may lead to or be part of a coil tube (not shown) that expands or contracts depending on the pressure present in the pressure chamber 30. The expansion and contraction produces a pressure reading via needle 34 on the pressure gauge. Other types of tubes, including helical shaped, c-shaped, and spiral shaped coil tubes may be utilized consistent with the present invention. The internal coil tube has a small diameter and drilling fluid and mud can clog this tube, creating inaccurate readings. This can be difficult to fix in certain environments where pressure equipment 35 is utilized. For example, the pressure equipment may comprise subsea BOPs or the like.

The flange assembly 10 defines the internal pressure chamber 30, 32 with a piston 12 disposed within the chamber 30, 32. The piston 12 divides the chamber into a first or upper chamber 30 and a second or lower chamber 32, whereby the first chamber is in fluid communication with the pressure gauge through passageway 31 and gland nut 22. In other words, chamber 30 is on one side of the piston and chamber 32 is on an opposite side of piston 12. The seals around the piston prevents possibly contaminated hydraulic fluid in pressure equipment 35 from fluid flow therebetween and commingling with clean hydraulic fluid for pressure gauge 26. However, pressure changes and pressure magnitude is transmitted by the movable piston from the pressure equipment to the pressure gauge. The lower or second chamber is in fluid communication with the pressure equipment 35 being monitored.

In this embodiment, the piston 12 is secured within the chamber 30, 32 by at least one retainer ring 18 that prevents the piston 12 moving out of the flange 10. At least one seal ring 14 and at least one wear ring 16 may be utilized to create a seal between the first or upper chamber 30 and the second or lower chamber 32, whereby the pressure from the lower chamber 32 engages the piston 12. The piston 12 is responsive to pressure imbalance to regulate and equalize pressure in the upper chamber 30 to match that of the lower chamber 32.

This arrangement does not allow the pressure equipment fluid in the second or lower chamber 32 to enter the Gauge, as some of these drilling fluids contain debris which may clog and/or permanently damage the gauge 26. This design protects the gauge 26 from these fluids with possible contaminants, while still allowing the pressure gauge 26 to accurately monitor the pressure equipment 35.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A subsea pressure gauge flange assembly connectable to subsea pressure equipment, said subsea pressure gauge flange assembly comprising:

a pressure gauge;

a flange housing defining a pressure chamber;

said flange housing being connected to said pressure gauge;

a flange on said flange housing that extends radially outwardly from said flange housing, said flange being connectable to said subsea pressure equipment with a plurality of threaded fasteners that extend through a plurality of openings in said flange, said flange housing and said flange are formed as one piece;

a piston mounted in said flange housing, said piston dividing said pressure chamber into a first chamber and a second chamber, said first chamber being in fluid communication with said pressure gauge when said pressure gauge is connected to said flange housing, said second chamber is in fluid communication with said subsea pressure equipment when said subsea pressure equipment is connected to said flange housing;

said piston is responsive to pressure in said second chamber to activate said pressure gauge through said first chamber, said piston being sealed to prevent fluid from the second chamber from entering the first chamber; and a gland nut comprising gland nut external threads that mate to receptacle threads formed in a flange housing receptacle, said pressure gauge comprising a tube, said tube comprising a conical tube end, said tube extending through said gland nut, said flange housing receptacle further comprising a conical recess surface that mates with said conical tube end to form a conical metal to metal seal.

2. The subsea pressure gauge flange assembly of claim 1, further comprising a removeable retainer ring mounted in said flange that retains said piston within said flange housing.

3. The subsea pressure gauge flange assembly of claim 1, further comprising a gauge protector mounted to said flange housing, said gauge protector being spaced apart from said pressure gauge and extending around a face of said pressure gauge.

4. The subsea pressure gauge flange assembly of claim 1, wherein said flange housing comprises an upper portion with a smaller diameter than said flange, wherein said upper portion of said flange housing is connected to said pressure gauge without use of an additional flange.

5. The subsea pressure gauge flange assembly of claim 1, further comprising a collar within said gland nut.

6. The subsea pressure gauge flange assembly of claim 5, wherein said tube comprises tube threads on an exterior of said tube that mate to gland nut internal threads within said collar of said gland nut.

7. The subsea pressure gauge flange assembly of claim 6, further comprising said gland nut internal threads are left-handed.

8. A method to provide a subsea pressure gauge flange assembly for connection to subsea pressure equipment and a pressure gauge, said method comprising:
   mounting a piston in said subsea pressure gauge flange assembly;
   providing a pressure chamber with a first chamber on one side of said piston that is connectable to said subsea pressure equipment;
   providing a second chamber on an opposite side of said piston that is connectable to said pressure gauge;
   providing that said piston is sealed to prevent fluid flow from said subsea pressure equipment to said pressure gauge;
   providing a flange with openings to receive threaded fasteners on said subsea pressure gauge flange assembly for connection to said subsea pressure equipment;
   providing that said piston is moveable in response to pressure changes in said subsea pressure equipment to transmit pressure from said subsea pressure equipment to said pressure gauge; and
   providing a gland nut comprising gland nut external threads that mate to receptacle threads formed in a flange housing receptacle, said pressure gauge comprising a tube extending from a face of said pressure gauge, said tube comprising a conical tube end, said tube extending through said gland nut, said flange housing receptacle further comprising a conical recess surface that mates with said conical tube end to form a conical metal to metal seal.

9. The method of claim 8, further comprising providing that said flange radially extends from a flange housing, providing that said flange housing and said flange are machined in one piece, and wherein said flange housing is connected to said pressure gauge without use of an additional flange.

10. The method of claim 9, further comprising providing a gauge protector mounted to said flange housing, said gauge protector being formed from a length of flat metal plate that is bent to extend around a face of said pressure gauge and is spaced apart from said pressure gauge.

11. The method of claim 8, further comprising providing a collar within said gland nut.

12. The method of claim 11, further comprising providing said tube comprises tube threads on an exterior of said tube that mate to gland nut internal threads within said collar of said gland nut.

13. The method of claim 8, further comprising providing a removeable retainer ring mounted in said flange that retains said piston within said flange housing.

* * * * *